United States Patent [19]

Buettiker

[11] 4,313,796
[45] Feb. 2, 1982

[54] GUIDE POST MODIFICATION FOR NUCLEAR FUEL ASSEMBLY

[75] Inventor: Paul Buettiker, Bloomfield, Conn.

[73] Assignee: Combustion Engineering, Inc., Windsor, Conn.

[21] Appl. No.: 61,583

[22] Filed: Jul. 30, 1979

[51] Int. Cl.³ .................. G21C 3/32; G21C 15/00
[52] U.S. Cl. .................................. 376/353; 376/443
[58] Field of Search ............. 176/50, 61, 86 R, 36 R, 176/78

[56] References Cited

U.S. PATENT DOCUMENTS

| | | | |
|---|---|---|---|
| 2,735,811 | 2/1956 | Weinberg et al. | 176/86 R |
| 3,178,356 | 4/1965 | Wheelock | 176/50 |
| 3,249,510 | 5/1966 | Dohm, Jr. et al. | 176/86 R |
| 3,481,832 | 12/1969 | Rickert | 176/50 |
| 3,814,667 | 6/1974 | Klumb et al. | 176/78 |
| 4,030,975 | 6/1977 | Anthony et al. | 176/78 |

FOREIGN PATENT DOCUMENTS

| | | | |
|---|---|---|---|
| 2162283 | 7/1973 | France | 176/86 R |
| 1007206 | 10/1965 | United Kingdom | 176/86 R |

Primary Examiner—Harvey E. Behrend
Attorney, Agent, or Firm—L. James Ristas

[57] ABSTRACT

An improved guide tube post which decreases the flow induced vibration of a cylindrical control rod suspended therethrough. The inner wall of the post, near where it exits into a diffuser region, is provided with a polygonal cross section. When, due to random fluctuation, the rod assumes an eccentric position near the wall of the post, the polygonal post geometry provides a relatively large angle between the post wall and the surface of the rod near the wall. It has been found that if this angle is too small, strong secondary flows develop along the length of the control rod and interact with other vortices in the diffuser region, to produce the vibration driving force. The polygonal cross section in the post modifies the secondary flow to reduce the intensity of the interaction with the diffuser vortices.

6 Claims, 8 Drawing Figures

GUIDE POST MODIFICATION FOR NUCLEAR FUEL ASSEMBLY

BACKGROUND OF THE INVENTION

This invention relates to reducing the flow induced vibration of a center body member within a conduit having an abrupt increase in cross section, and in particular to reducing the vibration of a nuclear reactor control rod in its guide tube.

The fission rate and thus the heat generation in modern power reactors is usually controlled by the insertion and removal of control rods into or between fuel assemblies in the reactor core. Particularly in reactors of the pressurized-water type, cylindrical control rods are reciprocated within guide tubes which are part of the fuel assembly. The fuel assemblies are subjected to the flow of primary coolant in order to remove the heat generated in the fuel. When in the core, control rods also produce heat through the nuclear transformation associated with their high neutron absorption rate, and so the control rods must also be cooled. Thus a requirement is imposed on the design of the guide tube for assuring that a minimum flow rate through the guide tubes will exist at all times.

During power production most of the control rods are maintained in a withdrawn position above the core. The lower tips of the rods, however, are not completely withdrawn from the guide tubes. Recent operating experience has shown that rodded fuel assemblies that have been in an operating reactor for a period of time have significant wear on the inner walls of the guide tubes at precisely the elevation corresponding to the withdrawn control rod tips.

It is known that under some conditions a self-excited vibration of a blade-type control element can occur when the insertion of the blade into a narrow upstream section of the flow path between fuel assemblies is less than a critical distance. Also, the fluid flow rate through the path must exceed a critical value for this vibration to occur. Suggestions have been made for reducing these vibrations by inserting labyrinth-type flow restrictions at various locations along the flow path downstream of the leading end of the blade, or by introducing a mechanical restraint to provide a lateral force which prevents the build up of small random vibrations.

Flow induced periodic vibrations have also been observed in arrangements having a cylindrical rod eccentrically located in an annular diffuser. It is believed that two kinds of vortices interact as follows to produce the periodic driving force. When the rod is centered in the tube, a diffuser vortex ring forms around the rod (like a donut) in the diffuser region as the flow separates upon exiting the guide tube. If the rod becomes eccentric in the tube, axial vortices, also called secondary flows, originate near the control rod tip and travel along the rod before entering the diffuser region where vortex bursting occurs. The interaction in the diffuser region of the bursting axial vortices with the diffuser vortex ring produces an oscillating driving force on the control rod.

It has been proposed to provide a circumferential fence in the flow path downstream of the diffuser, or to provide strakes in the outer wall of the diffuser starting at the diffuser mouth and extending longitudinally downstream of the diffuser. These solutions are not practical for use in nuclear reactors because the diffuser region can be very large.

Since nuclear reactor control rods often are not exactly centered in their guide tubes, the rod tip has a tendency to assume a rest position against the inner wall of the tube. Any significant tip vibration against the inside of the guide tube could produce wear on the inner wall and ultimately perforate the guide tube. It has been found that, except for significantly reducing the mass flow rate in the guide tube, the above suggested remedies for reducing flow induced vibration of a control rod are only marginally effective. If the flow rate is reduced sufficiently to eliminate vibration, it is often not possible to adequately cool the control rod.

SUMMARY OF THE INVENTION

It is an object of the present invention to reduce the flow induced vibration of an elongated cylindrical control rod disposed in a control rod guide tube having a diffuser region downstream of the control rod tip.

It is a further object to provide an improved nuclear fuel assembly that reduces the flow induced vibration of a control rod suspended in the withdrawn position in a guide tube.

It is another object to provide a fuel assembly having guide posts at its upper end that supress flow induced control rod vibrations yet do not interfere significantly with control rod scram nor significantly impede the upward flow of coolant.

According to the invention the internal geometry of the upper end of the guide tube is modified to restructure the axial vortex (or secondary flow) pattern which interacts with the diffuser vortice ring to produce the periodic driving force on the rod in the diffuser region. The inner wall of the upper end of the tube near the tube exit is provided with a polygonal cross section. When, due to random fluctuation, the rod assumes an eccentric position near the wall of the guide tube, the polygonal geometry provides a relatively large angle between the tube wall and the circumference of the control rod near the wall. It has been found that if this angle is too small, significant secondary flows (axial vortices) result which, together with the diffuser vortex ring give rise to the severe vibration problem. The invention provides a larger angle than occurs with a cylindrical control rod approaching a circular wall cross section, resulting in weaker secondary flows (or axial vortices).

For a given amount of flow energy transformed into axial vortices, the present invention tends to produce a plurality of weak pairs of vortices, which is preferable to the single pair of stronger vortices produced with the conventional guide tube. This is because the irregular surface of the tube wall, having a plurality of discontinuities, tends to prevent the formation of the single pair of large vortices.

Another advantage of the invention is that existing, conventional guide tubes can be modified even after the entire fuel assembly has been fabricated. For example, in the preferred embodiment a cylindrical guide tube post can be machined to provide a hexagonal cross section having a minor diameter equal to the original inner diameter of the post.

BRIEF DESCRIPTION OF THE DRAWINGS

Other objects and advantages of the invention will be evident from the accompanying description and drawings in which:

FIG. 3a is a view of the inventive guide post with a control rod centered therein, taken along the same line as FIG. 2a;

FIG. 4 is a graphic representation of the performance improvement of the invention of the type shown in FIG. 3a over the conventional guide post shown in FIG. 2a.

DESCRIPTION OF THE PREFERRED EMBODIMENT

Figure 1:
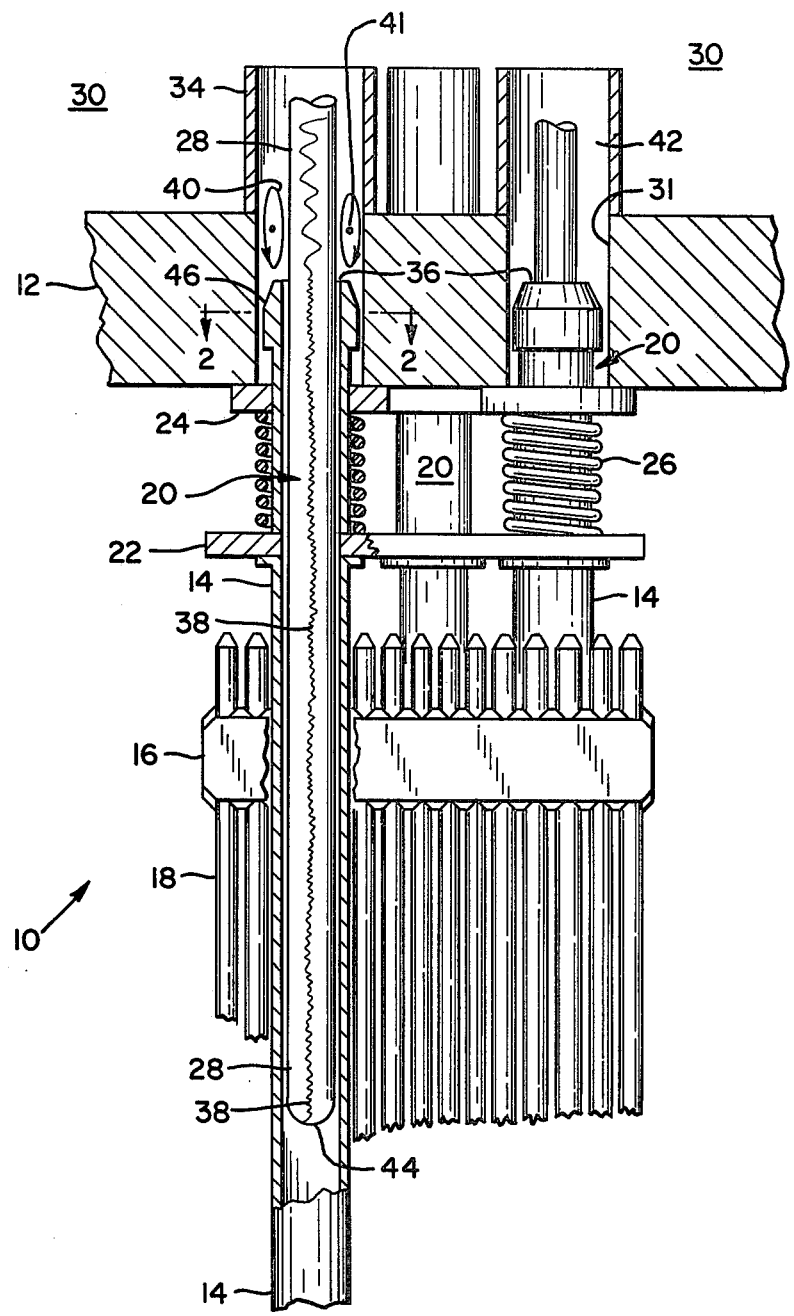
FIG. 1 is a partially sectioned elevation view of the upper end of a typical nuclear fuel assembly showing the interface of the assembly with the uper guide structure and control rods.

FIG. 1 shows the upper portion of a nuclear reactor fuel assembly 10 engaged with the fuel alignment plate 12 during typical nuclear reactor operating conditions. The fuel assembly 10 includes a plurality of guide tubes 14 to which are attached fuel spacer grids 16 which form a matrix to support a plurality of fuel elements 18. The guide tubes 14 typically extend a distance of approximately 13 feet from the fuel alignment plate 12 to the fuel assembly lower end fitting (not shown). The guide tubes 14 usually have guide posts 20 attached to their upper ends, either directly or indirectly by common attachment to a perforated flow plate 22. The guide post 20 may be of the replaceable type, and is in effect merely an extension of the guide tube. A spider-shaped holddown plate 24 having one lobe associated with each guide post 20 is located below the alignment plate 12 and is vertically movable relative to the guide post in order to transmit a downward force from the alignment plate 12 through the holddown springs 26 to the guide tubes 14 whereby the assembly is held down against the upward flow of coolant over the fuel elements.

During the course of their lifetimes within a reactor most assemblies 10 will have control rods 28 located within the guide tubes 14. The control rods 28 are typically about 15 feet long and are rigidly held at their upper ends (not shown) and reciprocated vertically within the guide tubes 14. The control rod 28 is protected from the highly turbulent coolent flow that interacts with the fuel elements 18 below the alignment plate 12, and from the strong cross-flows existing in the plenum region 30 above the alignment plate 12. This protection is afforded by the guide tube 14, the post 20, conduit means such as opening 31 in the alignment plate 12, and shrouds 34 in the plenum region 30. Although not shown, the alignment plate 12 has a plurality of flow passages for directing the coolant flow from the fuel assemblies 10 into the plenum region 30.

A continuous flow of coolant must be maintained within each guide tube 14 to provide cooling to the control rods 28. Because the control rods 28 are so elongated, each rod is unlikely to be exactly centered within its respective guide tube 14 and therefore, especially when the rod is in the withdrawn position shown in FIG. 1, the rod will be eccentric relative to the guide post exit 36. It is believed that such eccentricity produces a pattern of axial vortices 38, which interact with the diffuser vortex ring 40. The axis of the diffuser vortex ring 40 is generally in a horizontal plane, as schematically represented at 41. The structure associated with the control rod 28 as it exits the guide posts 20 can be generally described as a center rod eccentrically disposed within a rather abrupt diffuser region represented generally at 42. It should be appreciated that depending on the particular nuclear reactor, the exact structure defining the diffuser region 42 and the diffuser cross section can be quite different.

During reactor operation, most control rods 28 are maintained in the withdrawn position so that the control rod tip 44 is continuously located, depending on the particular reactor, at a fixed elevation approximately 1 to 2 feet from the guide post exit 36. Inspection of fuel assemblies 10 removed from operating reactors shows severe fretting on the inside of the guide tube 14 at precisely the elevation corresponding to the control rod tip 44 in the withdrawn position. Analyses were made and tests outside the reactor were performed in order to identify the mechanism causing the guide tube wear. Although the source of wear has not been completely explained analytically, it was found that the vibrations causing the control rod interaction with the guide tubes 14 are apparently self-excited and predominantly at the natural frequency and the first and second overtones of the control rod (all frequencies less than 20 Hz for a typical control rod). These vibrations are believed to be the result of guide tube flow effects caused by driving forces related to the periodic interaction near the guide post exit 36 of the axial vortices 38 with the diffuser vortex 40, as described above.

A variety of proposed improvements were tested in a flow loop wherein the dimensions and flow rates were similar to typical reactor operating conditions. Most of the tested guide posts had very little effect in reducing the vibration of the control rod in the guide tube 14, but the present invention was effective in reducing vibration.

FIG. 3 shows the preferred embodiment of the invention and FIG. 2 shows the conventional structure which it replaces, the control rod 28 being shown in the inserted position as in FIG. 1. The cross section shown in FIGS. 2 and 3 is taken along the shoulder portion 46 of the guide post 20 shown in FIG. 1.

Figure 2A:
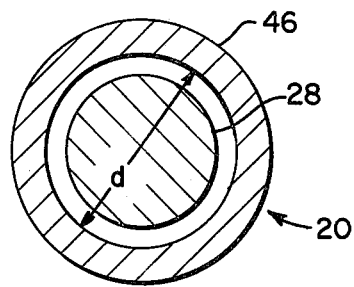
FIG. 2a is a view of a conventional guide post with a control rod centered therein, taken along the line 2—2 of FIG. 1.

The prior art guide tube 14 and post 20 shown in FIG. 1, and centered control rod 28 shown in FIG. 2a, typically have a tube inner diameter of about 0.90 inches and a control rod outer diameter of 0.86 inches. During full power flow conditions, typically about 9 gallons per minute (gpm), the control rod was found to vibrate with an acceleration of about 0.20 g's. The vibration acceleration as a function of coolant flow rate through the guide tube, as measured in a full scale laboratory mock-up, is shown graphically in FIG. 4. As explained above, it is believed that the random fluctuations of the control rod 28 within the tube 14 eventually cause the rod to approach one wall 48 of the post as shown in FIG. 2b, whereby a pair of contrarotating axial vortices 38 are formed on the opposite side of the rod.

Figure 3A:
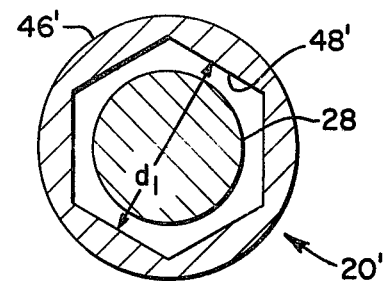

FIG. 3a shows the invention in an embodiment where the post in FIG. 2a has been machined to provide a hexagonal cross section where the minor diameter d1 is substantially equal to the initial inner diameter d of the post. The hexagonal cross section preferably extends for a distance of about two to three inches below the guide tube exit 36 (FIG. 1).

Figure 2B:
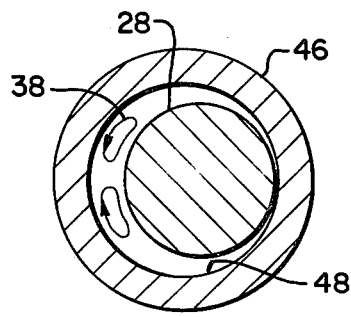
FIG. 2b is a view similar to that of FIG. 2a showing the rod as eccentric within the tube, and the pair of contrarotating axial vortices produced by a conventional guide post.
Figure 3B:
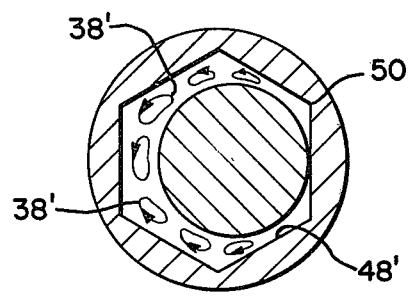
FIG. 3b is a view of the inventive guide post with an eccentric control rod therein, similar to the view in FIG. 2b, showing a plurality of weaker axial vortices.

FIG. 3b shows the control rod in the eccentric position corresponding to FIG. 2b. Instead of the pair of axial vortices 38 formed in the arrangement of FIG. 2b, the invention produces a larger number of smaller, weaker vortices 38'. The interaction of these vortices with the diffuser vortex ring 40 shown in FIG. 1, produces a weaker driving force at each vortex intersection, and furthermore distributes these forces over a greater surface of the control rod so that the driving force is not concentrated. It is believed that the plurality of discontinuities 50 along the wall 48', at the junctures of each face of the hexagon, tends to inhibit the formation of the single larger pair of axial vortices.

Figure 4:
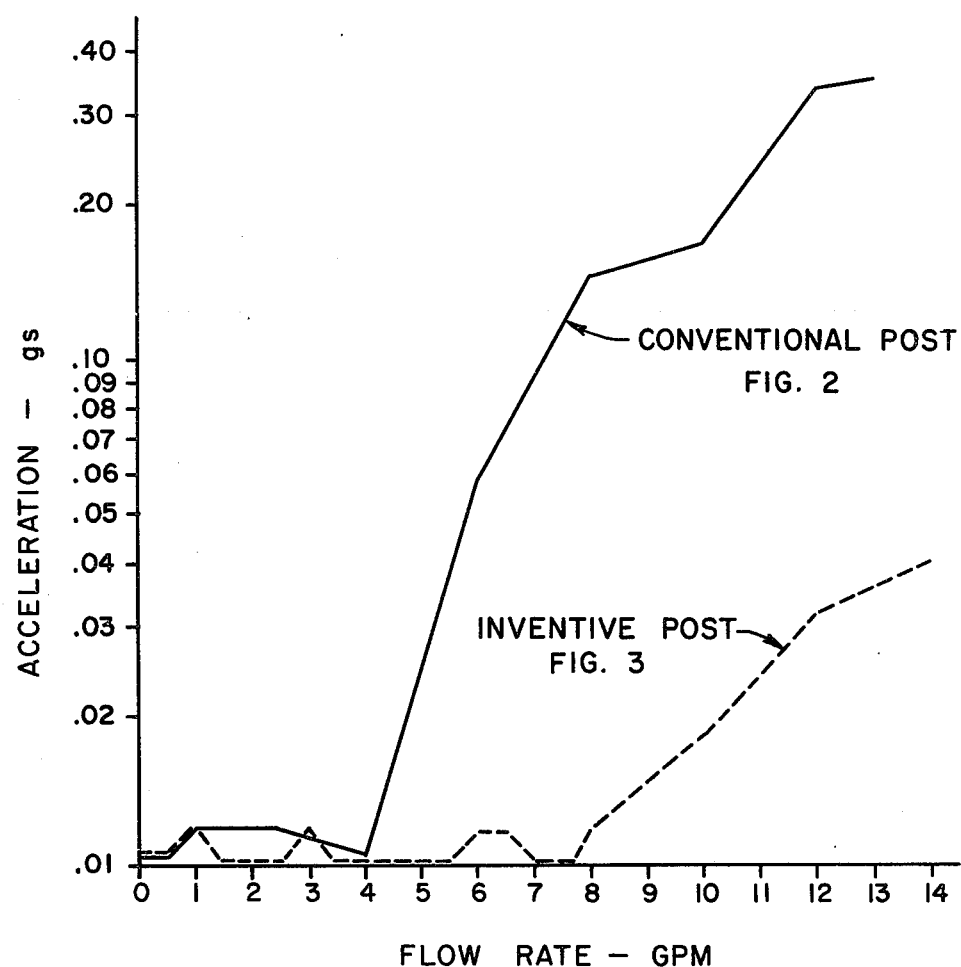

As shown in FIG. 4, the acceleration response of the rod 28 in a laboratory test using the post 20' illustrated in FIG. 2 shows significant benefit for decreasing the problem associated with flow induced control rod vibrations. For example, at the full power flow rate of 9 gpm, the improved acceleration response has dropped to 0.015 g's, a reduction by more than a factor of ten from the conventional design response of 0.16 g's.

Figure 2C:
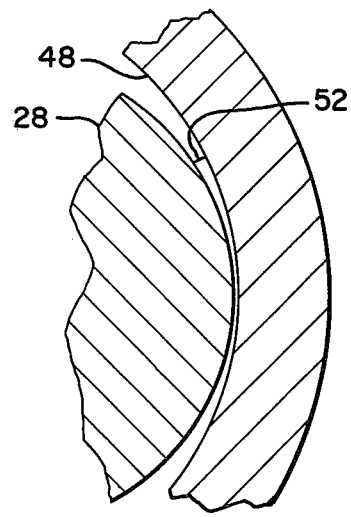
FIG. 2c is an enlarged view of a portion of FIG. 2b, showing the relationship between the rod and the closest tube wall surface.
Figure 3C:
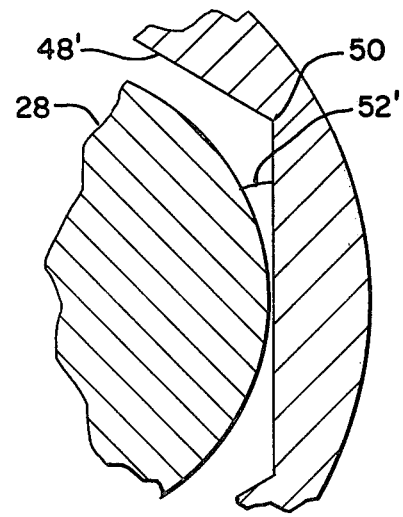
FIG. 3c is an enlarged view of a portion of FIG. 3b.

Another feature characteristic of the polygonal cross section is illustrated in FIGS. 2c and 3c. In FIG. 2c, the control rod 28 has approached the guide tube wall 48 forming a relatively narrow angle 52 on either side of the contact point leading to considerable shear stress discontinuities. In FIG. 3c, the hexagonal cross section presents a different geometry as the control rod approaches the guide tube wall such that a larger angle 52' is formed therebetween. This larger angle is believed to reduce shear stress discontinuities in planes normal to the upwardly moving coolant, so that less energy is converted into secondary flows (axial vortices) 38'.

It should be understood that convex polygons other than hexagons may be used with the present invention, but the hexagonal shape has been found to be the easiest to machine into existing guide tube posts 20 while maintaining sufficient post thickness and sufficient clearance between the wall 48 and the rod 28 so as not to inhibit control rod scram. It is believed that, although a polygon such as a square could improve the conventional design, in normal applications the polygon will be six or eight-sided, with the practical upper limit being about twelve sides. It should also be understood that, although a symmetric polygon is preferred, this is not a necessary requirement.

Furthermore, it should be noted that in nuclear reactor installations the control rod is typically chosen to be large relative to the guide tube so that the annulus therebetween can be generally characterized as narrow. If the central rod member is significantly smaller than the guide tube, the benefits of the present invention may not be achievable since the tendency of the vibration to arise in the first instance is thereby lessened. The present invention therefore provides significant benefits where the ratio of the minimum guide tube inner diameter to the control rod outer diameter is no greater than about 1.5 whereby the annulus therebetween may be characterized as narrow.

I claim:

1. A nuclear fuel assembly for a water-cooled nuclear reactor having a reciprocating cylindrical nuclear control rod, comprising:
   a plurality of vertically oriented fuel elements;
   a cylindrical guide tube fixedly supported parallel to and coextensive with said fuel elements, for telescopingly receiving the control rod from above and for carrying an upward flow of coolant from below wherein the ratio of the minimum inner diameter of the guide tube to the control rod outer diameter is no greater than about 1.5, said guide tube having a cylindrical inner wall; and
   a hollow control rod guide post extending from the upper end of the guide tube and in axial alignment therewith, the post having an inner wall forming a convex polygon.

2. The improved guide tube of claim 1 wherein the polygon is symmetric.

3. The improved guide tube of claim 2 wherein the polygon has a minor diameter substantially equal to the inner diameter of the cylindrical portion of the guide tube.

4. The improved guide tube of claim 3 wherein the polygon has from four to twelve sides.

5. The improved guide tube of claim 3 wherein the polygon is a hexagon.

6. In a nuclear reactor having a plurality of vertical nuclear fuel assemblies each assembly having associated therewith a longitudinal, cylindrical guide tube for carrying an upward flow of liquid, and a cylindrical control rod suspended from above and reciprocable within the guide tube, the rod having an outer diameter at least two-thirds the inner diameter of the guide tube, said guide tube having a cylindrical inner wall, wherein the improvement comprises:
   a hollow control rod guide post at the upper end of the guide tube having an inner convex polygonal wall, the cross-sectional flow area of said hollow guide post being at least as large as that of the inner cylindrical portion of the guide tube, said hollow post being in axial alignment with said guide tube, whereby the flow pattern formed in the post as a result of an eccentric orientation of the rod with respect to the tube is characterized by a multiplicity of weaker rather than a pair of stronger axial vortices.

* * * * *